United States Patent [19]

Hiereth et al.

[11] Patent Number: 4,803,969

[45] Date of Patent: Feb. 14, 1989

[54] PROCESS FOR THE LOAD-DEPENDENT CONTROL OF A HYDRAULIC DRIVE FOR A COMPRESSOR ARRANGED AT AN INTERNAL-COMBUSTION ENGINE

[75] Inventors: Hermann Hiereth, Esslingen; Dieter Messerschmidt, Korntal, both of Fed. Rep. of Germany

[73] Assignee: Daimler-Benz Aktiengesellschaft, Stuttgart, Fed. Rep. of Germany

[21] Appl. No.: 69,205

[22] Filed: Jul. 1, 1987

[30] Foreign Application Priority Data

Jul. 12, 1986 [DE] Fed. Rep. of Germany ....... 3623676

[51] Int. Cl.⁴ .............................................. F02B 39/08
[52] U.S. Cl. ...................................... 123/561; 60/608; 60/487
[58] Field of Search ......................... 60/607, 608, 487; 123/561

[56] References Cited

U.S. PATENT DOCUMENTS

| 2,774,342 | 12/1956 | Schilling | 123/561 |
| 3,473,322 | 10/1969 | Wolf | 60/607 |
| 3,869,866 | 3/1975 | Timoney | |
| 4,083,188 | 4/1978 | Kumm | 60/608 X |

FOREIGN PATENT DOCUMENTS

| 0087316 | 8/1983 | European Pat. Off. | |
| 3320827 | 12/1984 | Fed. Rep. of Germany | |
| 3521403 | 12/1986 | Fed. Rep. of Germany | 123/561 |
| 632615 | 11/1949 | United Kingdom | 60/608 |

Primary Examiner—Michael Koczo
Attorney, Agent, or Firm—Barnes & Thornburg

[57] ABSTRACT

A process for the load-dependent control of a hydraulic drive for a compressor arranged at an internal-combustion engine, the compressor being driven by a hydraulic motor that, in turn, is acted upon by pressure from a hydraulic pump, the internal-combustion engine itself driving the hydraulic pump. In order to ensure a relatively high compressor speed as early as during the idling operation of the internal-combustion engine, and have available an optimal torque for a positive load change, while keeping minimal the additional fuel consumption required for the hydraulic drive, during the idling operation of the internal-combustion engine, the hydraulic pump is adjusted into the full-delivery position and the hydraulic motor is adjusted into the minimum intake position. Upon a subsequent positive load change, after an indicated hydraulic motor control pressure is reached, the hydraulic motor is guided into the maximum intake position, and after an indicated hydraulic pump control pressure is reached, the hydraulic pump is guided into the direction of the minimum delivery position. After an indicated charging pressure limit is reached, the hydraulic drive is disconnected from the compressor. Also described is an arrangement for carrying out this process.

10 Claims, 2 Drawing Sheets

PROCESS FOR THE LOAD-DEPENDENT CONTROL OF A HYDRAULIC DRIVE FOR A COMPRESSOR ARRANGED AT AN INTERNAL-COMBUSTION ENGINE

BACKGROUND AND SUMMARY OF THE INVENTION

The present invention relates to a process and an apparatus for the load-dependent control of a hydraulic drive for a compressor arranged at an internal-combustion engine.

On the basis of German Published Unexamined Patent Application No. 3,320,827, it is known to act upon a hydraulic motor by means of a hydraulic pump driven by an internal-combustion engine, this hydraulic motor, in turn, continuously driving a compressor for the supercharging of the internal-combustion engine. The above-mentioned patent text does not contain any information on how a hydraulic drive must be designed and how it must be controlled so that an optimal supercharging exists in any load range while utilizing the kinetic energy of the exhaust gases of the internal-combustion engine.

The present invention, therefore, has an objective of providing a process for the load-dependent control of a hydraulic drive, by which even during the idling of the internal-combustion engine, a relatively high compressor speed can be obtained, and in positive load changing, an optimal torque is available for the high-speed acceleration of the compressor. Nevertheless, the additional fuel consumption that must be accepted because of the work for the hydraulic drive to be carried out by the internal combustion engine, is kept to a minimum by this process.

This and other objectives are achieved in a process for the load-dependent control of a hydraulic drive for a compressor arranged on an internal combustion engine by providing a process comprising adjusting a hydraulic pump into a full delivery position during idling of the internal combustion engine. The process also includes guiding the hydraulic pump from the full-delivery position to a zero-delivery position according to predetermined characteristics after a positive load change of the internal combustion engine from idling and after a predetermined hydraulic pump control pressure in a hydraulic pipe connecting the hydraulic pump and the hydraulic motor is reached. The hydraulic drive is disconnected after a predetermined charging pressure limit is reached.

In an alternate embodiment of the process, the hydraulic pump is adjusted into a full-delivery position and the hydraulic motor into a minimum intake position during idling of the engine. The hydraulic motor is guided from the minimum intake position to a maximum intake position and the hydraulic pump is kept in a full-delivery position after a positive load change of the engine from idling and when a predetermined hydraulic motor control pressure in the hydraulic pipe is reached. The hydraulic pump is guided according to predetermined characteristics from the full-delivery position to a zero-delivery position after a predetermined hydraulic pump control pressure is reached in the hydraulic pipe. The hydraulic drive is disconnected from the compressor after a predetermined charging pressure limit is reached.

Due to the fact that the hydraulic pump is in the full-delivery position as early as during the idling of the internal-combustion engine, a high compressor speed can therefore be obtained as early as during idling. The high compressor speed is achievable by means of a pump of relatively small dimensions if a hydraulic motor is used having an adjustable working volume and if this motor is in the minimum position during the idling of the internal-combustion engine. A high compressor speed during idling means that in this operating condition, a relatively high supercharging pressure exists in the charge air pipe in the internal-combustion engine.

If now a positive load change takes place, the internal-combustion engine speed increases immediately which results in an immediate rising of the delivery flow of the hydraulic pump. However, an increased delivery flow also at the same time results in an increase of the torque made available by the hydraulic motor in order to increase the compressor acceleration. This effect, in turn, is also achieved by a hydraulic pump with small dimensions while using an adjustable hydraulic motor, if its capacity in the case of a positive load change is brought into the maximum position which results in an increase of the throughflow of hydraulic fluid through the hydraulic motor per revolution. As a result, the torque offer of the hydraulic motor increases in order to overcome the forces of inertia of the compressor, of the compressor shaft and of the exhaust gas turbine arranged in the exhaust gas pipe of the internal-combustion engine.

Based on the compressor speed that previously was relatively high during idling anyway, the compressor therefore, when changing from idling into the load range of the internal-combustion engine, exhibits an optimal acceleration behavior, whereby the so-called "turbo-hole", which is the time period until the compressor is at a speed that is required for a good supercharging, is reduced to a minimum. When the required compressor speed or the indicated loading pressure limit is reached i.e., when the exhaust gas turbine furnishes the required power for the further acceleration of the compressor, the hydraulic drive is disconnected from the compressor. The hydraulic pump, in this embodiment, can be moved back to its zero delivery capacity or minimum delivery capacity. As a result, the additional fuel consumption of the internal-combustion engine that is necessary for the work required for the hydraulic drive is kept to a minimum. The adjusting of the hydraulic pump from the full-delivery position in the direction of the zero-delivery position that the permissible pressure in the hydraulic pipe is not exceeded, has the advantage that the pump driving power can be reduced to a minimum because of the elimination of the delivery of the excess amount that flows off in an unutilized way at the pressure relief valve.

An arrangement for carrying out the process described above includes turbine means connected to drive train means for transmitting torque to the compressor, this turbine being acted upon by exhaust gas flow in an exhaust gas pipe of the internal combustion engine. The drive train means includes, between the compressor and a hydraulic motor, transmission gearing means having one way clutch means that starts to operate when a charging pressure limit is reached. The hydraulic motor has a constant intake volume, and the hydraulic pump includes means for controlling its delivery volume.

In another preferred embodiment, the intake volume of the hydraulic motor is adjustable as a function of the pressure in the hydraulic pipe connecting the hydraulic pump and the hydraulic motor.

Other objects, advantages and novel features of the present invention will become apparent from the following detailed description of the invention when considered in conjunction with the accompanying drawings.

DETAILED DESCRIPTION OF THE DRAWINGS

Figure 1:
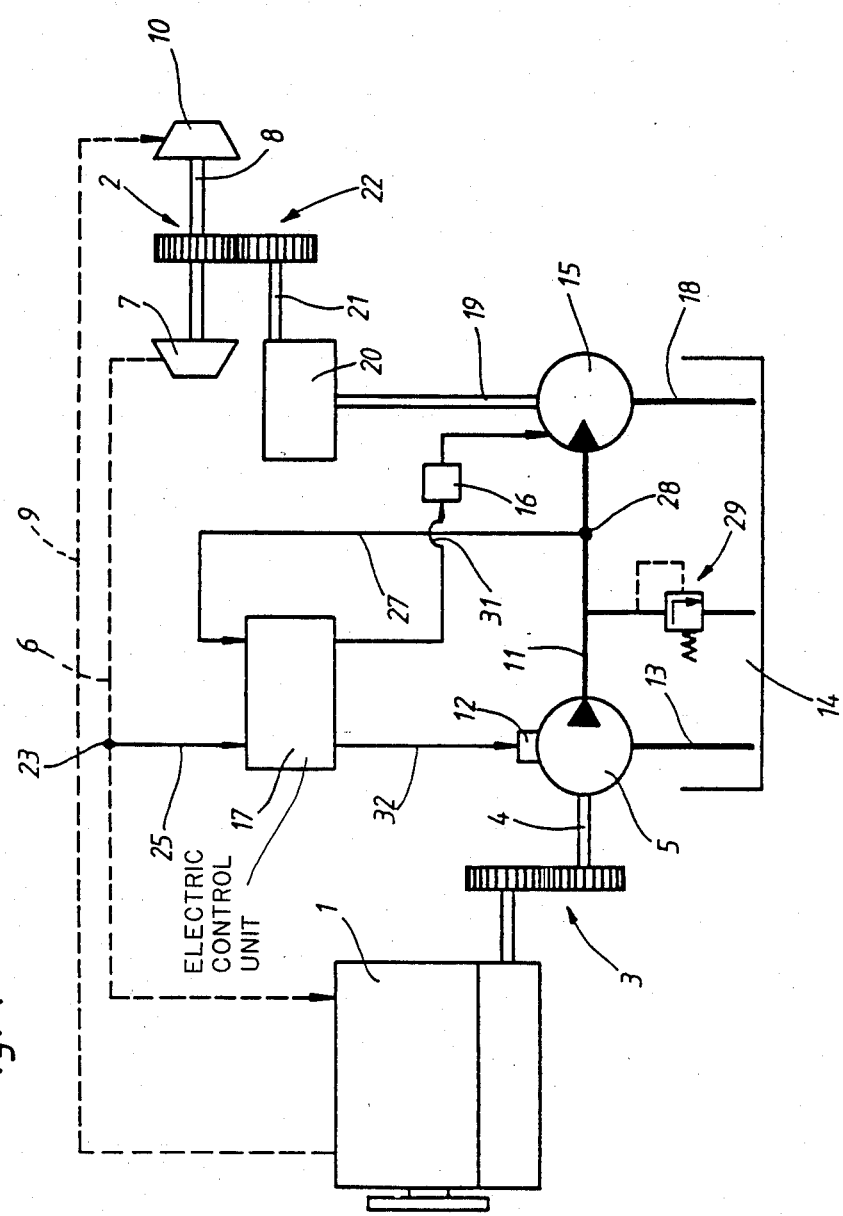
FIG. 1 is a diagrammatic representation of a preferred embodiment of a device for carrying-out the process according to the present invention.

Reference number 1 in FIG. 1 refers to an internal-combustion engine that is supercharged by a turbocharger 2 and drives a hydraulic pump 5, via a pair of gear wheels 3 and a drive shaft 4. The turocharger 2, in this preferred embodiment, has a compressor 7 that is arranged in the charge air pipe 6 of the internal combustion engine 1. This compressor 7 is connected in a torsionally fixed manner, via a shaft 8, with a turbine 10 arranged in the exhaust gas pipe 9 of the internal-combustion engine 1.

The hydraulic pump 5 is an adjustable axial piston pump. The displacement volume of this pump 5, in this embodiment, adjusts itself as function of the pressure existing in the hydraulic pipe 11 that is connected to it, such that the displacement volume of the pump 5 is maximal below a certain pump control pressure that is adjustable manually at the pump 5. Should the pressure in the hydraulic pipe 11 become higher that the adjusted pump control pressure, the pump 5 immediately reduces its displacement volume, until the adjusted pump control pressure is reached again in the hydraulic pipe 11. The pump 5 contains an electronically controllable magnetic valve 12 by which the pump 5 is brought into the zero-delivery position. The pump 5, via an intake connection 13, takes in a hydraulic fluid, such as hydraulic oil, from a tank 14. The pump 5 transports this fluid to an axial piston motor 15, via the hydraulic pipe 11, the working volume of which is also adjustable by means of an actuating drive 16 that is controllable by an electronic control unit 17 via a control line 31.

The hydraulic oil that has passed the motor 15 flows back into the tank 14 through the pipe section 18. The output shaft 19 of the hydraulic motor 15 leads into a transmission 20, the output shaft 21 of which, in turn drives the turbocharger 2 thereby supercharging the internal-combustion engine 1, via a pair of gear wheels 22. The transmission 20 is a conventional transmission which in this embodiment, has a mechanical one-way clutch means 50 operable such that a torque is transmittable from the hydraulic motor 15 to the turbocharger 2 only as long as the compressor speed $n_V$ multiplied with the ratio i of the transmission 20 is no larger than the speed of $n_A$ of the drive shaft 19 of the hydraulic motor 15. The transmission 20 is used as a mechanical highdrive, the ratio i of which may be between 1:20 and 1:40. In a contemplated embodiment, the one-way clutch means 50 is arranged directly on the turbocharger shaft 8.

In the charge air pipe 6, a pressure sensor 23 is arranged that furnishes to the control unit 17, via the measured-value line 25, an electric signal that corresponds to the actual charging pressure $p_L$. The same applies to a measured-value line 27 that, via a pressure sensor 28, furnishes an electric signal to the control unit 17 that corresponds to the actual pressure in the hydraulic pipe 11.

During the idling of the internal-combustion engine 1, the working volume of the pump 5 is maximal, while that of the hydraulic motor 15 is minimal. The pump 5 therefore, per revolution of its drive shaft 4, delivers the maximum amount of hydraulic fluid. In contrast, the working volume of the hydraulic motor 15, during idling, is in minimum position, so that it can take in only a minimum amount of hydraulic fluid per revolution of its output shaft 19. Therefore, in order to be able to approximately absorb the volume flow made available by the pump 5 during idling, the hydraulic motor 15 must run at a relatively high speed. Thus, a relatively high compressor speed exists as early as during the idling of the internal-combustion engine 1.

When a positive load change takes place, the speed of the internal-combustion engine 1 increases directly, so that the volume flow delivered by the pump 5 will also increase. Because the hydraulic motor 15 cannot take in a rising volume flow by means of an increase of its speed, pressure rises in the hydraulic pipe 11. When a certain hydraulic motor control pressure is reached in the hydraulic pipe 11, for example between 190 bar and 220 bar, the working volume of the hydraulic motor is changed into the maximum position, via the actuating drive 16. Thus, per revolution of the drive shaft 19 of the hydraulic motor 15, the largest possible volume is delivered by the hydraulic motor 15. This has the result that now, for the upward acceleration of the compressor 7, the hydraulic motor 15 can make available a maximum torque, whereby the compressor 7 is very rapidly brought to the speed that is required for the respective internal-combustion engine load.

Because the hydraulic motor 15 has only a limited intake capacity at the maximum working volume, the pressure in the hydraulic pipe 11 continues to rise with an increasing internal-combustion engine speed. When the indicated pump control pressure is reached, for example between 250 and 300 bar, the pump 5 will start to reduce its working volume in such a way that this control pressure in the hydraulic pipe 1 remains almost constant. The reduction of the working volume need not necessarily take place while maintaining constant the pressure in the hydraulic pipe 11, but it is also contemplated that this reduction takes place in certain preferred embodiments according to predetermined characteristics as embodied in a curve, for example, as a function of the internal-combustion engine speed. In these contemplated embodiments the engine speed is, for example, sensed via a speed sensor and supplied to the control unit 7 which then controls an actuating drive for the adjustment of the working volume of the hydraulic pump according to the predetermined characteristic curve, this actuating drive not being required in the embodiment shown in FIG. 1.

When a predetermined loading pressure limit GW is reached or exceeded in the charge air pipe 6, the hydraulic drive is disconnected from the turbocharger 2. This takes place by a corresponding control of the magnetic valve 12 integrated in the pump 5 by the control unit 17, via a control line 32, by which the working volume of the pump 5 is reduced to a minimum. In this embodiment, in which the hydraulic pump 5 must not act upon any additional consuming means, the pump 5 is moved completely into the zero-delivery position.

As a result of this reduction of the delivery flow of the hydraulic pump 5, the hydraulic motor 15 now is also no longer driven, so that its output speed $n_A$ moves toward zero, or according to this embodiment, becomes completely zero. This means that now the product of the compressor speed $n_V$ multiplied with the transmission ratio i becomes larger than the speed $n_A$ of the output shaft 19 of the hydraulic motor 15, so that the turbocharger 2 is disconnected from the hydraulic drive by the one-way clutch means 50 integrated into the transmission 20. The pump 5 will now remain in the zero-delivery position until the pressure in the charge air pipe falls below the loading pressure limit GW and at the same time, the internal-combustion engine is in a full-load or idling operation.

In embodiments in which additional consuming means are connected to the pump 5, the working volume of the pump 5 is not brought into the zero position, but rather into a minimum delivery position.

In order to prevent the pressure in the pipe 11 from becoming too high due to a possible functional disturbance at the pump 5 or at the hydraulic motor 15, a pressure relief valve 29 is arranged at the pipe 11, via which, if the excess pressure is too high, the hydraulic fluid can be returned directly into the tank 14.

Instead of a one-way clutch means that is integrated in the transmission, for the disconnecting of the hydraulic drive and the compressor in certain preferred embodiments, a separating clutch is used that is controlled by the control unit. It is also contemplated to use a pump with a fixed working volume instead of an adjustable axial piston pump, and to regulate the delivery flow by an intake throttle that is arranged in the intake pipe 13 of the pump 5 and is controlled by the electronic control unit 17 as a fuction of the internal-combustion engine speed.

Figure 2:
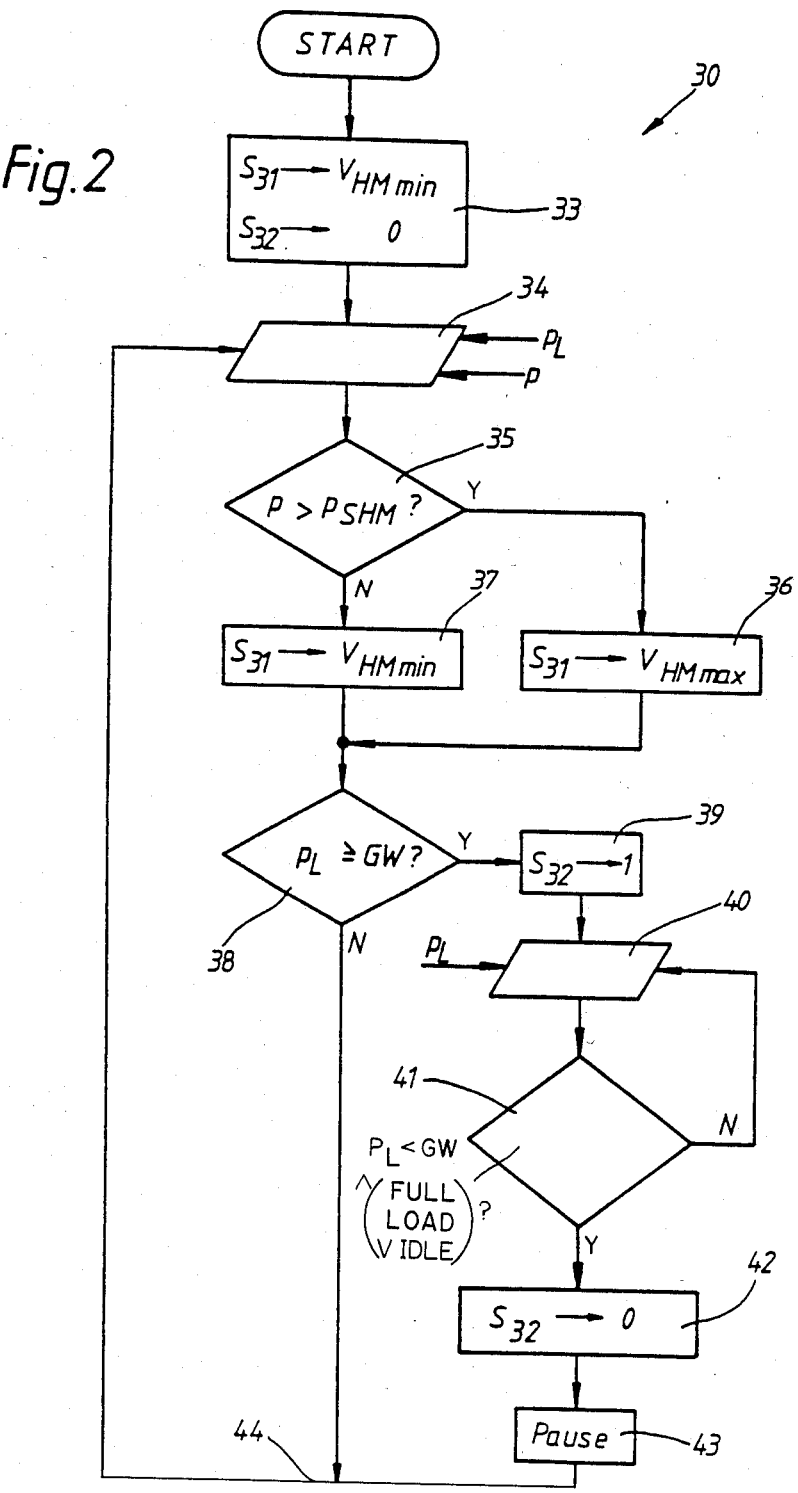
FIG. 2 is a flow chart of the method of operation of the control unit provided in the preferred embodiment of FIG. 1.

FIG. 2, in a flow chart 30, shows the method of operation of the control unit that in FIG. 1 has the reference number 17. With the start of the internal-combustion engine 1, the control unit 17 supplies a signal $S_{31}$ to the control line 31 that changes the working volume $V_{HM}$ of the hydraulic motor 15 into the minimal position $V_{HMmin}$. The control unit supplies a signal $S_{32}$ to the control line 32 for controlling the magnetic valve 12 integrated in the pump 5 so that the pump 5 automatically adjusts its working volume only as a function of the pressure in the hydraulic pipe 11. This control condition of the magnetic valve 12, for reasons of simplicity, in FIG. 2 has the number 0. The symbol $S_{32}0$ in the operations block 33 therefore means that the control unit 17 supplies a signal $S_{32}$ to the control line 32 that brings the magnetic valve 12 into the 0 position, or if it already is in this position, that it remains in this 0 position. Analogously to the above, the symbol $S_{31}V_{HMmin}$ represents that the control unit 17 supplies a signal $S_{31}$ to the control line 31 which changes the working volume of the hydraulic motor 15 into the minimum position $V_{HMmin}$, or if it already is in the minimum position, it leaves it in this position.

In the input block 34 that follows block 33, the actual values of the charging pressure $P_L$ and of the pressure $p$ in the hydraulic pipe 11 take over. The two sensors 23 and 28 supply to the control unit 17 only the voltage signals that corresponds to the previously mentioned parameters. If necessary, these parameters are converted by means of characteristic diagrams that are fixedly stored in a memory of the control unit 17, into the actual speed and pressure values. However, for reasons of simplicity, this step is not shown explicitly in FIG. 2.

In the branch block 35, it is inquired whether the previously sensed actual pressure p in the pipe 11 is greater than a hydraulic motor control pressure $p_{SHM}$ that determines the adjusting point in time of the working volume of the hydraulic motor 15. The value of this hydraulic motor control pressure $p_{SHM}$ may be stored, for example, in a read-only memory of the control unit 17. If the actual pressure p is greater, the working volume of the hydraulic motor 15 in the operations block 36 is changed into the maximum position $S_{31}V_{HMmax}$. If the control pressure $p_{SHM}$ has not yet been exceeded, the working volume remains in block 37 in the minimum position $S_{31}V_{HMmin}$.

Subsequently, a checking takes place in the branch block 38 as to whether the compressor 7 or the turbocharger 2 is fast enough so that the hydraulic drive can be disconnected. If, for this purpose, the limit value GW for the charging pressure $p_L$ has been reached or is exceeded, the control of the magnetic valve 12 integrated into the pump 5 takes place in block 39 such that the working volume of the pump 5 is brought into the zero-delivery position ($S_{32}\rightarrow1$). As a result, the turbocharger 2 is disconnected from the hydraulic drive.

The actual charging pressure $p_L$ is then again read into the input block 40. In the branch block 41 that follows, it is checked whether the charging pressure $p_L$ has already fallen below a fixedly stored limit value GW, and whether at the same time, the internal-combustion engine is in full-load or idling condition (for example, by determining the control lever angle in the case of a diesel engine, or by determining the throttle valve position in the case of a gasoline engine). If this is not the case, a branching to the input block 40 takes place.

The limit value GW may, for example, be a charging pressure that is stored as a constant quantity in the memory, or, according to the operating condition of the internal-combustion engine, is determined from a characteristic diagram stored in the memory (for example, as a function of the internal-combustion engine speed and of the internal-combustion engine load).

When there is a falling below the GW and a full-load or idling operation exists at the same time, a renewed actuation of the hydraulic drive takes place in block 42 by the corresponding control of the magnetic valve 12 of the pump 5 ($S_{32}\rightarrow0$) so that the pump 5 delivers again. In order to take into account that the hydraulic drive required a certain time for its acceleration, a time delay is implemented in the control sequence by means of block 43. Following that, the control branches off to point 44, from which it returns to the input block 34. If the limit value GW for the charging pressure $p_L$ inquired in block 38 has not yet been reached, in other words, if the hydraulic drive is still required for accelerating the turbocharger, the control moves directly to point 44.

Instead of an adjustable hydraulic motor, one with a constant working volume is used in certain contemplated embodiments. In these embodiments, the working volume of the hydraulic motor will be proportioned so as to ensure, in the case of a positive load change for the upward-acceleration of the compressor, there will never be a falling below an indicated minimum torque, and the size of the pump must be selected in such a way that there is never any falling below an indicated minimum speed of the compressor in the idling operation of the internal-combustion engine.

When the above type of combination is used, the instructions and blocks that concern the adjustment of the hydraulic motor 15 are not found in the control 30. Listed individually, these are the instruction $S_{31} \rightarrow$ VHMmin in block 33, the pressure p in block 34, the inquiry block 35 and the two operations blocks 36 and 37.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A process for the load-dependent control of a hydraulic drive for a compressor supercharger which supplies charging pressure to an internal-combustion engine, having a hydraulic pump driven by said internal-combustion engine, said hydraulic pump connected to drive a hydraulic motor via its hydraulic output pump pressure connected to said motor from said hydraulic pump via a hydraulic pipe, said hydraulic motor connected to drive said compressor via a drive train, a delivery flow of said hydraulic output pump pressure to said hydraulic motor being changeable between a minimum and a maximum, comprising the steps:
   adjusting said hydraulic pump into a full-delivery position during the idling of the internal-combustion engine;
   guiding said hydraulic pump from said full-delivery position to a zero-delivery position according to a predetermined schedule after a positive load change of said internal-combustion engine from said idling and after a predetermined hydraulic output pump pressure in said hydraulic pipe is reached; and
   disconnecting said drive from said hydraulic pump to said compressor supercharger after a predetermined charging pressure limit is reached.

2. A process according to claim 1, further comprising guiding said hydraulic pump into a minimum delivery position, and said hydraulic motor into said minimum intake position after said charging pressure limit is reached.

3. A process according to claim 1, further comprising guiding said hydraulic pump towards said zero-delivery position after said charging pressure limit is reached.

4. A process according to claim 1, further comprising guiding said hydraulic pump towards said zero-delivery position only after a predetermined time period after said charging pressure limit is reached.

5. A process according to claim 4, wherein said predetermined time period is between 2 and 8 seconds.

6. A process for the load-dependent control of a hydraulic drive for a compressor supercharger which supplies charging pressure to an internal-combustion engine, having a hydraulic pump driven by said internal-combustion engine, said hydraulic pump connected drive a hydraulic motor via its hydraulic output pump pressure connected to said motor from said hydraulic pump via a hydraulic pipe, said hydraulic motor connected to drive said compressor via a drive train, a delivery flow of said hydraulic output pump pressure to said hydraulic motor being changeable between a minimum and a maximum, comprising the steps:
   adjusting said hydraulic pump into a full-delivery position and said hydraulic motor into a minimum intake position during the idling of said engine;
   guiding said hydraulic motor from said minimum intake position to a maximum intake position and keeping said hydraulic pump in full-delivery position after a positive load change of said engine from said idling and when a predetermined hydraulic output pump pressure in said hydraulic pipe is reached;
   guiding said hydraulic pump according to a predetermined schedule from said full-delivery position to a zero-delivery position after a predetermined hydraulic output pump pressure is reached in said hydraulic pipe; and
   disconnecting said drive from said hydraulic pump to said compressor supercharger after a predetermined charging pressure limit is reached.

7. A process according to claim 6, further comprising guiding said hydraulic pump into a minimum delivery position, and said hydraulic motor into said minimum intake position after said charging pressure limit is reached.

8. A process according to claim 6, further comprising guiding said hydraulic pump towards said zero-delivery position after said charging pressure limit is reached.

9. A process according to claim 6, further comprising guiding said hydraulic pump towards said zero-delivery position only after a predetermined time period after said charging pressure limit is reached.

10. A process according to claim 9, wherein said predetermined time period is between 2 and 8 seconds.

* * * * *